(12) United States Patent
Ozawa

(10) Patent No.: US 7,558,656 B2
(45) Date of Patent: Jul. 7, 2009

(54) VEHICLE DATA RECORDING DEVICE

(75) Inventor: Tetsuya Ozawa, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 203 days.

(21) Appl. No.: 11/500,465

(22) Filed: Aug. 8, 2006

(65) Prior Publication Data

US 2007/0032930 A1     Feb. 8, 2007

(30) Foreign Application Priority Data

Aug. 8, 2005     (JP)     ............................. 2005-229587

(51) Int. Cl.
| G11B 5/00 | (2006.01) |
|---|---|
| G01M 17/00 | (2006.01) |
| G06F 3/00 | (2006.01) |
| G06F 5/00 | (2006.01) |

(52) U.S. Cl. ............................. 701/35; 360/5; 710/52; 710/56; 710/57

(58) Field of Classification Search .................... 701/35
See application file for complete search history.

(56) References Cited

U.S. PATENT DOCUMENTS

| 5,948,026 A | * | 9/1999 | Beemer et al. ................. 701/35 |
| 6,246,933 B1 | * | 6/2001 | Bague .......................... 701/35 |
| 6,314,478 B1 | * | 11/2001 | Etcheverry ................... 710/29 |

FOREIGN PATENT DOCUMENTS

JP     7-244064 A     9/1995

* cited by examiner

*Primary Examiner*—Thomas G Black
*Assistant Examiner*—Sze-Hon Kong
(74) *Attorney, Agent, or Firm*—Foley & Lardner LLP

(57) ABSTRACT

Provided is a vehicle data recording device in which detection values of an acceleration sensor 210 and an driving status detecting sensor 220 are periodically and continuously recorded in a ring buffer 120, a detection value which has already been recorded in the ring buffer 120 is recorded in a specific recording area of a recorder 130 before a new detection value is recorded in the ring buffer 120 when a recording condition is satisfied, while the new detection value is periodically recorded in another recording area of the recorder 130, and recording is performed by the recorder 130 until all detection values which have already been recorded in the ring buffer 120 when the recording condition is satisfied are entirely recorded in a specific recording area of the recorder 130.

10 Claims, 14 Drawing Sheets

US 7,558,656 B2

VEHICLE DATA RECORDING DEVICE

CROSS-REFERENCE TO THE RELATED APPLICATION

This application is based on and claims the priority benefit of Japanese Patent Application No. 2005-229587 filed on Aug. 8, 2005, the disclosure of which is incorporated herein by reference in its entirety.

BACKGROUND OF THE INVENTION

1. Field of the Invention

The present invention relates to a vehicle data recording device.

2. Description of the Related Art

Recently, a vehicle data recording device or a drive recorder employing a recording unit called a fight recorder which is installed in air planes has been researched. The vehicle data recording device records data associated with a vehicle's driving status detected by a sensor installed in a vehicle, so as to objectively carry out a post-analysis for analyzing the cause of an emergency status by the use of recorded data. For example, the emergency status may occur when impact force greater than a specific value is externally applied to the vehicle. In the vehicle data recording device, it is not practical to record data having a size which amounts to entire driving time periods due to its enormous recording capacity. For this reason, data is overwritten in a recording device in which data detected by a sensor for a predetermined time period is continuously rewritable. Further, data stored for a predetermined time period before the vehicle becomes the emergency statue is stored so as to be utilized in the post-analysis (for reference, see Japanese Unexamined Patent Publication No. 07-244064).

However, the vehicle data recording device has a drawback in that data detected by the sensor is no longer recorded after the data is recorded due to the occurrence of emergency condition. Therefore, for example, if the vehicle is under the influence of a greater impact force immediately after data is recorded in a state that impact force no less than a predetermined value is externally applied to the vehicle, the data is not recorded. As a result, there has been a problem in that a post-analysis such as a cause-analysis cannot be carried out when a further critical emergency condition occurs after the vehicle has already been under the emergency condition.

SUMMARY OF THE INVENTION

An object of the present invention is to provide a vehicle data recording device that can repeatedly record a detection value for a predetermined time period after and before the detection value of a sensor, which detects a vehicle status while running, satisfies a specific condition.

According to one embodiment of the present invention, there is provided a vehicle data recording device comprising: a vehicle status detecting sensor that detects a vehicle status while running; a ring buffer that records a detection value of the vehicle status detecting sensor, and includes a first recording area; a recorder that records a detection value of the vehicle status detecting sensor, and includes a second recording area and a third recording area; and a recording controller that normally performs a normal operation in which the detection value of the vehicle status detecting sensor is periodically recorded in the first recording area of the ring buffer, records the detection value of the vehicle status detecting sensor, which has already been recorded in the first recording area of the ring buffer, in the second recording area before the detection value of the vehicle status detecting sensor is periodically recorded in the first recording area of the ring buffer when the detection value of the vehicle status detecting sensor satisfies a specific condition, and thereafter performs a recording operation, in which a new detection value of the vehicle status detecting sensor is recorded in the first recording area of the ring buffer while the new detection value of the vehicle status detecting sensor is recorded in the third recording area of the recorder, until the detection value of the vehicle status detecting sensor, which has already been recorded in the first recording area of the ring buffer when the detection value of the vehicle status detecting sensor satisfies a specific condition, is entirely recorded in the second recording area of the recorder, and thereafter performs the normal operation.

DETAILED DESCRIPTION OF THE PREFERRED EMBODIMENTS

Hereinafter, exemplary embodiments of the present invention will be described in detail with reference to the accompanying drawings.

Figure 1:
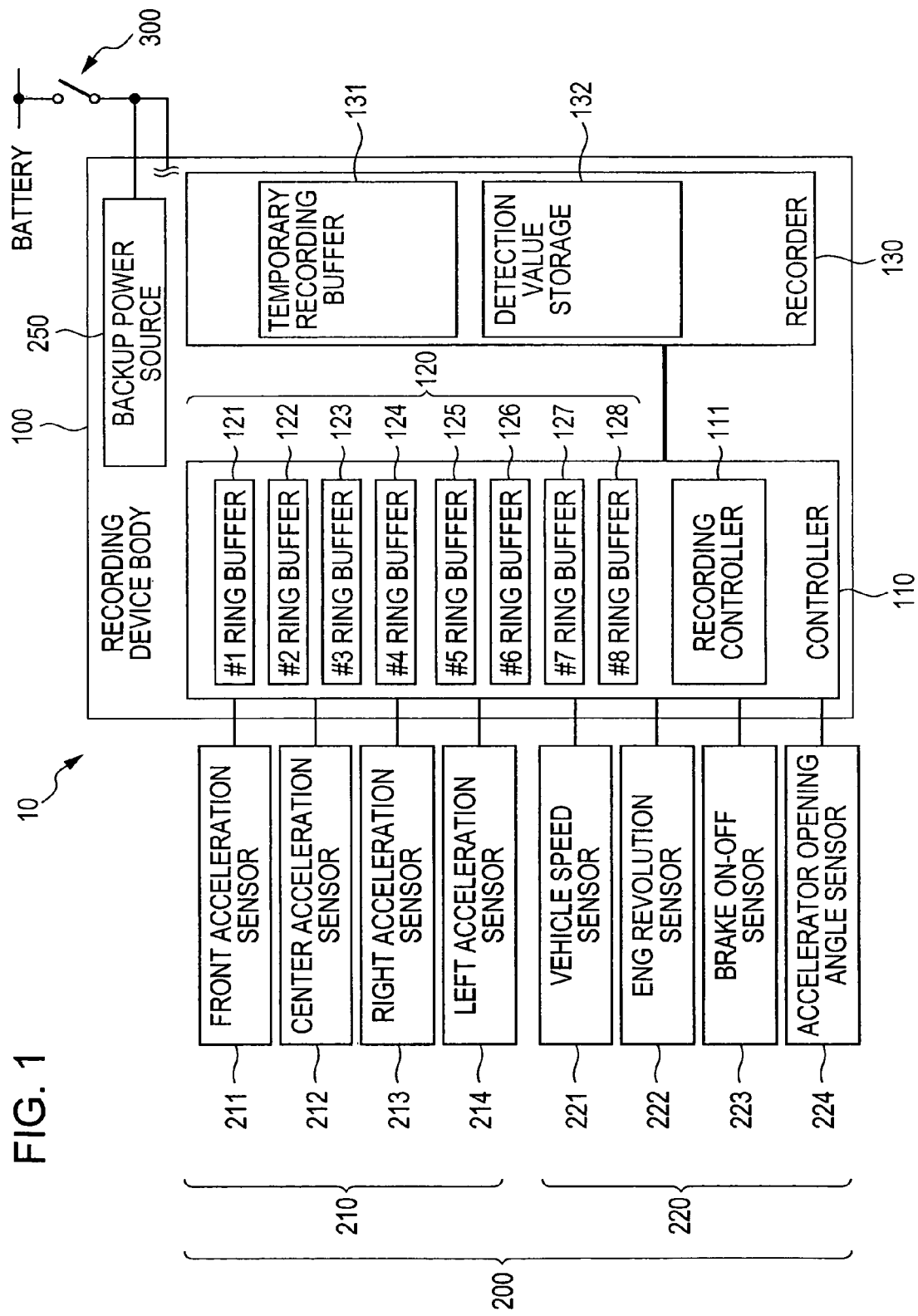
FIG. 1 is a block diagram of a vehicle data recording device according to an embodiment of the present invention.

FIG. 1 is a block diagram of a vehicle data recording device according to an embodiment of the present invention.

A recording device body 100 of a vehicle data recording device 10 is connected to a battery through an ignition switch 300. Further, a backup power source 250 is included in the recording device body 100 so as to be used when the battery is disconnected.

Moreover, the recording device body 100 is electrically connected with an acceleration sensor 210 that detects impact force externally applied to a vehicle, and a driving status detecting sensor 220 that detects a driving status of the vehicle. Each detection value is input to the recording device body 100. The acceleration sensor 210 and the driving status detecting sensor 220 are equivalent to a vehicle status detecting sensor 200.

The acceleration sensor 210 includes a forward acceleration sensor 211 that detects impact force applied from the forward direction of the vehicle, a central acceleration sensor 212 that detects impact force from the forward direction, and the right and left directions of the vehicle, a right acceleration sensor 213 that detects impact force from the right direction of the vehicle, and a left acceleration sensor 214 that detects impact force from the left direction of the vehicle.

Figure 2:
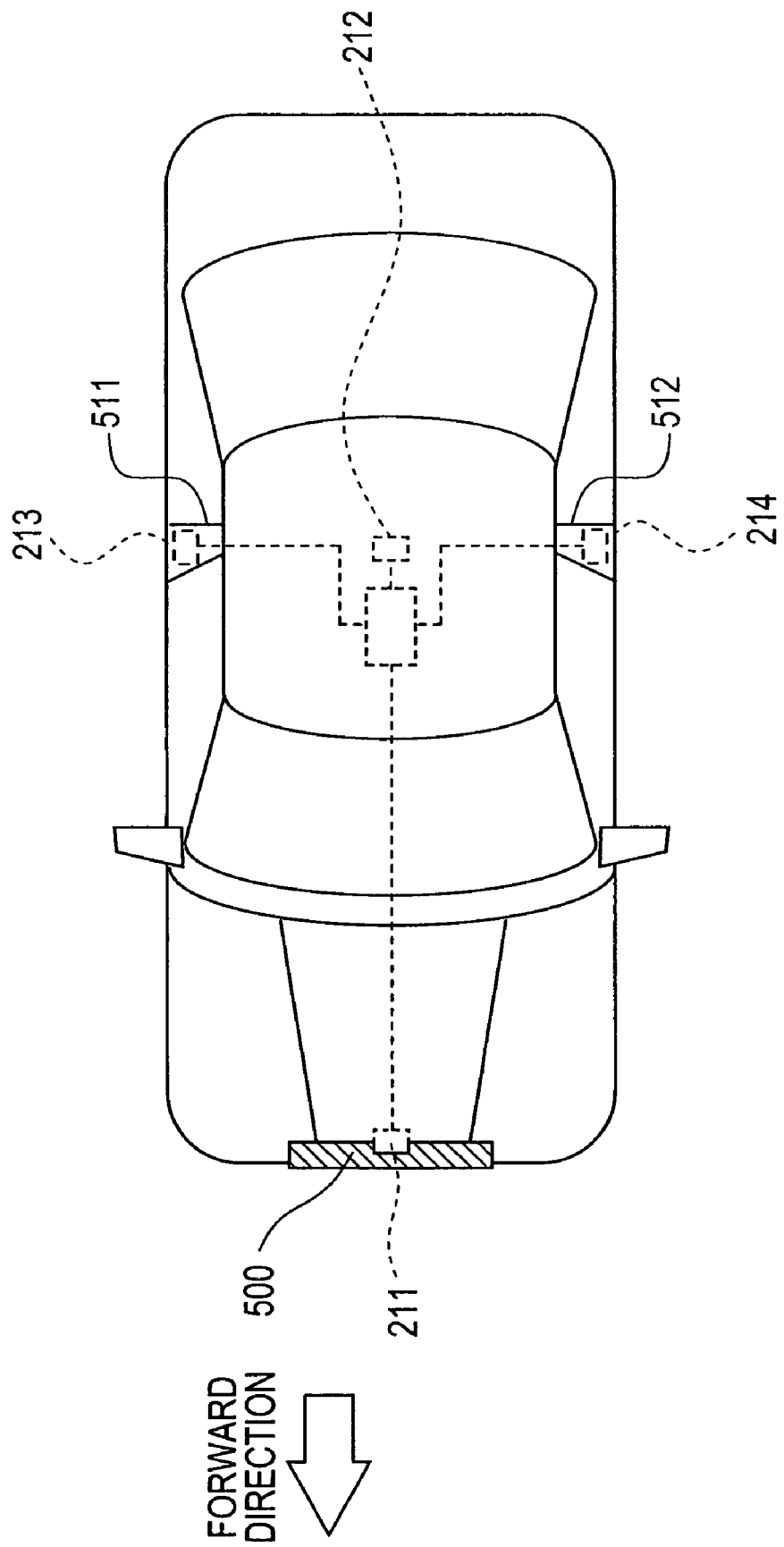
FIG. 2 shows an attachment location of an acceleration sensor according to an embodiment of the present invention.

As shown in FIG. 2, the forward acceleration sensor 211 is attached inside a front grill 500. The central acceleration sensor 212 is attached inside a central console (not shown) disposed in a substantial center of the vehicle. The right acceleration sensor 213 is attached inside a B filler 511 in the right side of the vehicle. The left acceleration sensor 214 is attached inside a B filler 512 in the left side of the vehicle.

The driving status detecting sensor 220 includes a vehicle speed sensor 221 that detects a vehicle speed, an engine (indicated by ENG in FIG. 1) revolution sensor 222 that detects the number of resolutions of an engine, a brake on-off sensor 223 that detects whether a brake is on or off, and an accelerator opening angle sensor 224 that detects an opening angle of an accelerator.

The recording device body 100 includes a controller 110, and a recorder 130 in which a detection value detected by the vehicle status detecting sensor 200 is stored.

The controller 110 includes a recording controller 111 that is a CPU by which recording is controlled, and a ring buffer 120 that temporarily records detection values detected by the acceleration sensor 210 and the driving status detecting sensor 220. The ring buffer 120 includes a first (indicated by #1 in FIG. 1) ring buffer 121 that records a detection value of the forward acceleration sensor 211, a second (indicated by #2 in FIG. 1) ring buffer 122 that records a detection value of the central acceleration sensor 212, a third (indicated by #3 in FIG. 3) ring buffer 123 that records a detection value of the right acceleration sensor 213, a fourth (indicated by #4 in FIG. 1) ring buffer 124 that records a detection value of the left acceleration sensor 214, a fifth (indicated by #5 in FIG. 1) ring buffer 125 that records a detection value of the vehicle speed sensor 221, a sixth (indicated by #6 in FIG. 1) ring buffer 126 that records a detection value of the engine revolution sensor 222, a seventh (indicated by #7 in FIG. 1) ring buffer 127 that records a detection value of the brake on-off sensor 223, and an eighth (indicated by #8 in FIG. 1) ring buffer 128 that records a detection value of the accelerator opening angle sensor 224.

In this configuration, the first to eighth rings 121 to 128 have recording capacity capable of recording seven detection values of the respective sensors, and use a so-called LIFO (last-in first-out) method in which new data is written after old data is deleted (as described below). Seven distinctive addresses are respectively assigned to recording areas where the seven detection values of the respective sensors are recorded, and a new detection value is recorded in a recording area indicated by a first pointer of the recording controller 111. In the first ring buffer 121, an address A1 is assigned as a first address, followed by addresses A1+1, A1+2, . . . , A1+7 (see FIG. 5). Further, in the second ring buffer 122, an address A2 is assigned as a first address, followed by A2+1, A2+ 2, . . . , A2+7 (not shown). Similarly, respective addresses are assigned to the third to eighth buffers 123 to 128. In addition, an initial value of FFh is recorded in each recording area.

The recorder 130 includes a temporary recording buffer 131 that temporarily records a detection value recorded in the ring buffer 120 in the case (as described below) that the detection value of the vehicle status detecting sensor 200 satisfies a specific condition, and a detection value storage 132 that stores a detection value recorded in the temporary recording buffer 131. The temporary recording buffer 131 and the detection value storage 132 include recording areas where fourteen detection values of the respective sensors are recorded. Fourteen distinctive addresses are allocated to the recording areas. In a recording area for recording a detection value of the vehicle speed sensor 221, an address B1 is assigned as a first address, followed by addresses B1+1, B1+2, . . . , B1+7, and an address C1 is assigned as a first address, followed by addresses C1+1, C1+2, . . . , C1+7 (see FIG. 8). In addition, in a recording area for recording a detection value of the central acceleration sensor 212, an address B2 is assigned as a first address, followed by addresses B2+1, B2+2, . . . , B2+7, and an address C2 is assigned as a first address, followed by addresses C2+1, C2+2, . . . , C2+7 (not shown). Likewise, respective addresses are assigned to recording areas where detection values of the right acceleration sensor 213, the left acceleration sensor 214, the vehicle speed sensor 221, the engine revolution sensor 222, the brake on-off sensor 223, and the accelerator opening angle sensor 224 are recorded. In addition, an initial value of FFh is recorded in each recording area. The temporary recording buffer 131 is equivalent to the recorder 130.

In the present embodiment, "the case that a detection value of the vehicle status detecting sensor 200 satisfies a specific condition" is defined as "the case that a detection value of the forward acceleration sensor 211 becomes no less than a predetermined value". Hereinafter, this will be referred to as "when a recording condition is satisfied".

Now, operations according to the present invention will be described with reference to the flowcharts of FIGS. 3 and 4, and the views of FIGS. 5 to 14. A recording operation for recording a detection value of the forward acceleration sensor 211 will be exemplified in the following descriptions.

Figure 3:
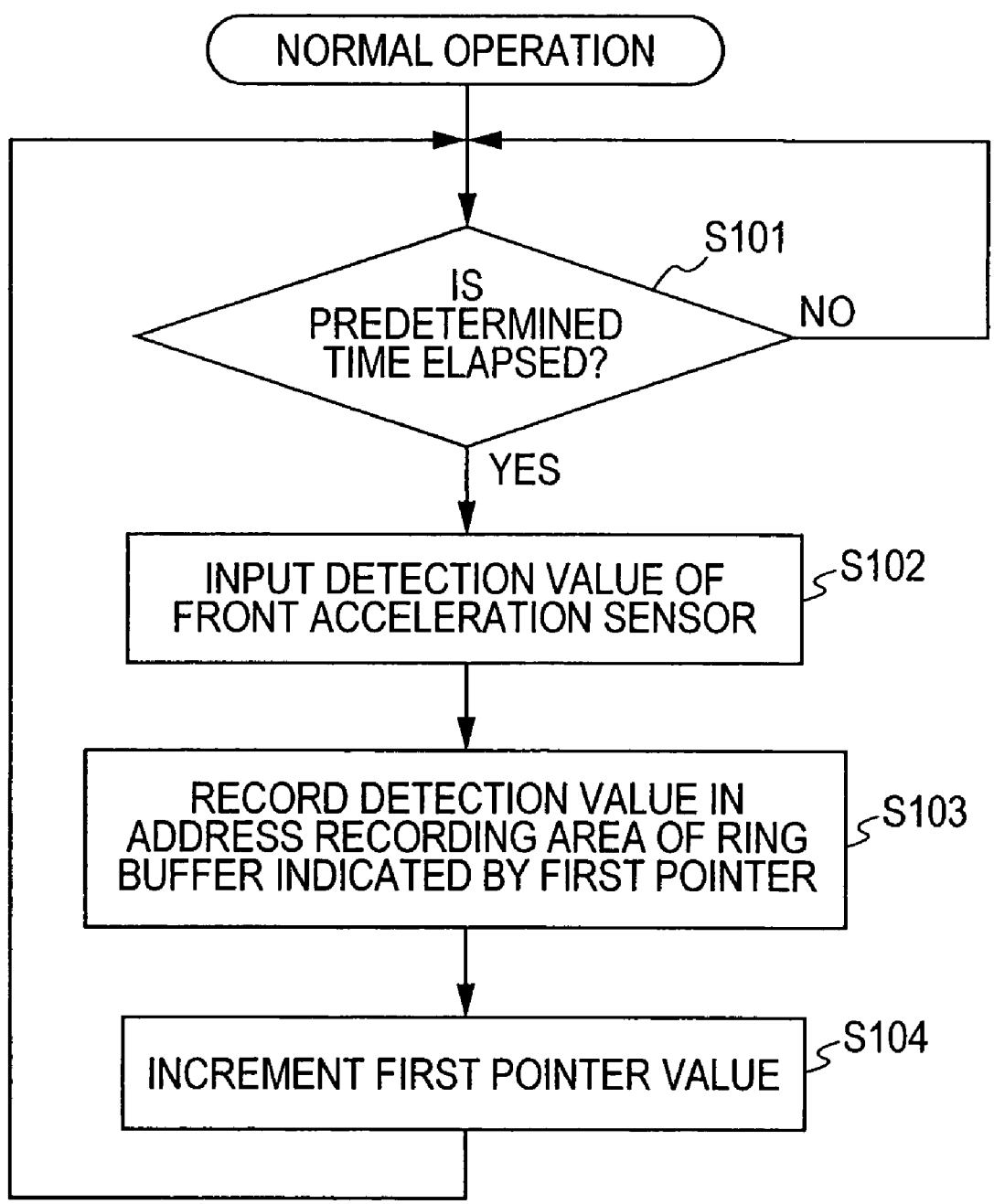
FIG. 3 is a flowchart showing a normal operation of a vehicle data recording device according to an embodiment of the present invention.

FIG. 3 is a flowchart showing a normal operation of the vehicle data recording device 10. The vehicle data recording device 10 performs a normal operation in which a detection value of the forward acceleration sensor 211 is continuously recorded in the first ring buffer 121.

In step S101, a wait state is provided to perform sampling for a specific time (a predetermined period).

In step S102, a detection value newly detected by the forward acceleration sensor 211 is periodically input to the controller 110. Thereafter, the flow proceeds to step S103.

In step S103, the detection value input to the controller 110 is periodically recorded in an address recording area of the first ring buffer 121 indicated by the first pointer.

Figure 5:
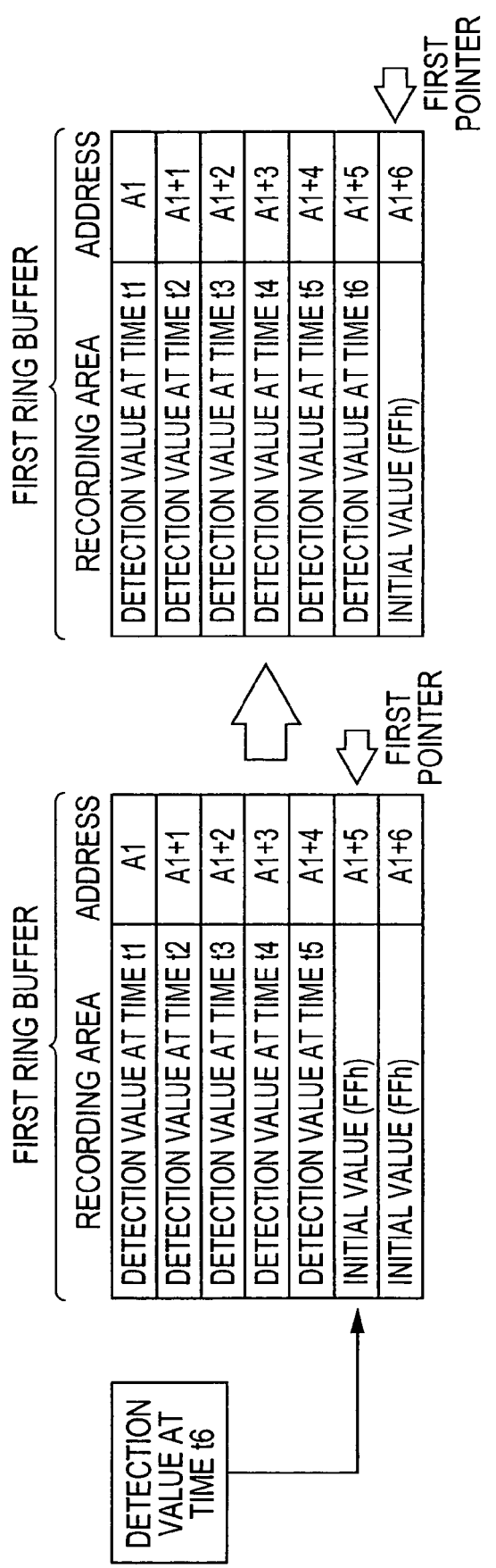
FIG. 5 shows an operation of a vehicle data recording device according to an embodiment of the present invention.

For example, as shown in FIG. 5, when at time t6, detection values at times t1 to t5 are respectively recorded in the recording areas of the address values A1 to A1+4 of the first ring buffer 121. Further, when the first pointer indicates the address A1+5, a detection value at time t6 is recorded in the recording area of the address A1+5.

Figure 6:
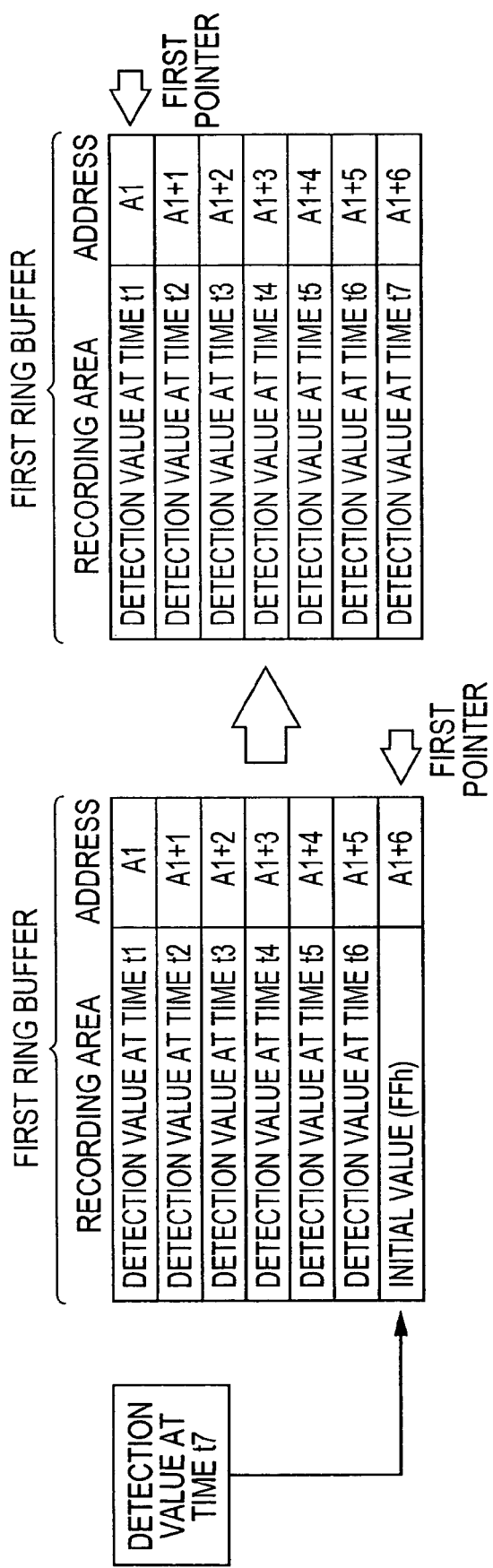
FIG. 6 shows another operation of a vehicle data recording device according to an embodiment of the present invention.

In addition, as shown in FIG. 6, when at time t7, detection values at times t1 to t6 are respectively recorded in the recording areas of the address values A1 to A1+5 of the first ring buffer 121. Further, when the first pointer indicates the address A1+6, a detection value at time t7 is recorded in the recording area of the address A1+6.

Figure 7:
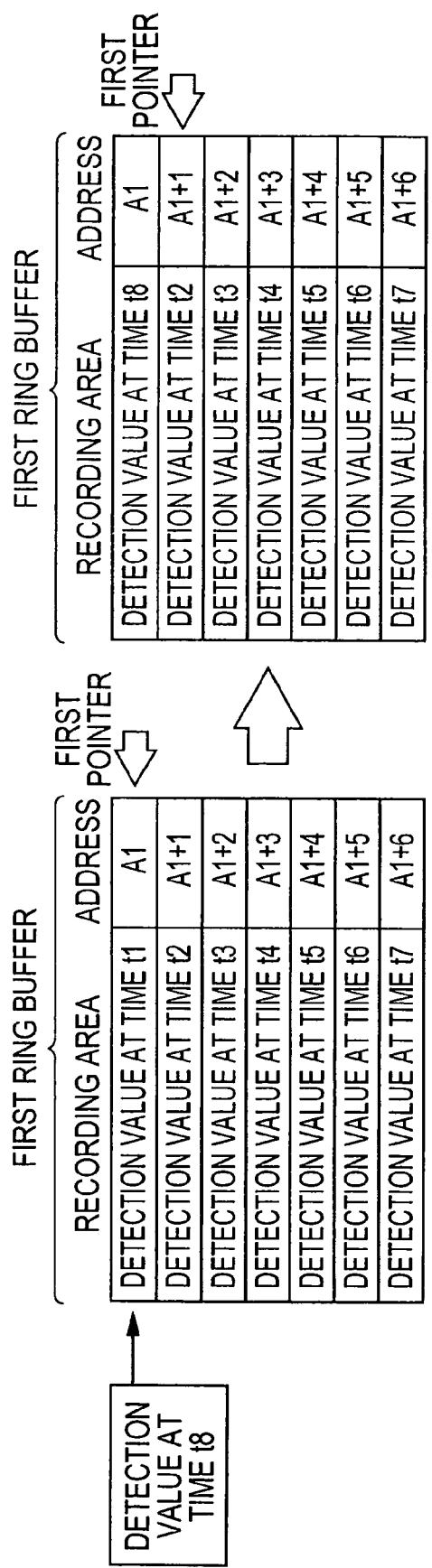
FIG. 7 shows another operation of a vehicle data recording device according to an embodiment of the present invention.

In addition, as shown in FIG. 7, when at time t8, detection values at times t1 to t7 are respectively recorded in the recording areas of the address values A1 to A1+6 of the first ring buffer 121. Further, when the first pointer indicates the address A1 following the address A1+6, a detection value at time t8 is recorded in the recording area of the address A1. In this case, since the detection value at time t1 has already been recorded in the recording area of the address A1, the detection value at time t1 is overwritten with the detection value at time t8.

Thereafter, the flow proceeds to step S104.

In step S104, the first pointer value is incremented by +1 for next recording.

For example, as shown in FIG. 5, the first pointer value indicates the address A1+6 after the detection value t at time t6 is recorded in the recording area of the address A1+5.

In addition, as shown in FIG. 6, after the detection value at time t7 is recorded in the recording area of the address A1+6, since seven address values A1 to A1+6 are set for an address value of the first pointer, a first pointer value returns back to A1, instead of A1+7.

In addition, as shown in FIG. 7, after the detection value at time t8 is recorded in the recording area of the address A1, the first pointer value becomes A1+1.

Thereafter, the flow proceeds back to step S101, and steps S101 to S104 are repeated.

According to the aforementioned steps, the vehicle data recording device 10 continuously records detection values of the forward acceleration sensor 211 to the first ring buffer 121.

Figure 4:
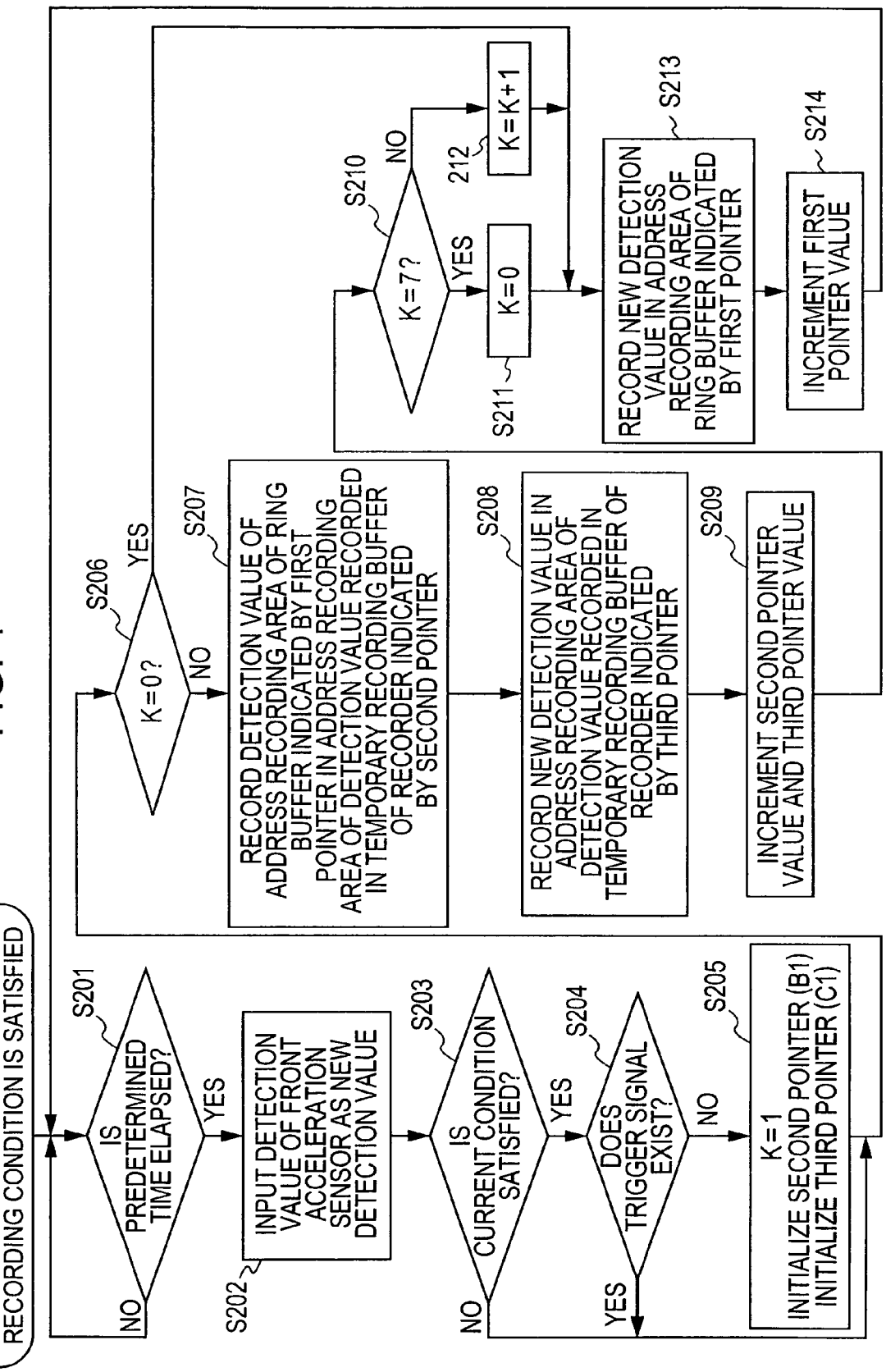
FIG. 4 is a flowchart showing a recording operation carried out when a recording condition is satisfied according to an embodiment of the present invention.

FIG. 4 is a flowchart showing a recording operation of the vehicle data recording device 10 when a recording condition is satisfied. The vehicle data recording device 10 periodically records a detection value previously recorded in the first ring buffer 121 to a specific recording area of the temporary recording buffer 131 before a new detection value is recorded when a recording condition is satisfied. Further, the vehicle data recording device 10 periodically records the new detection value to another recording area of the temporary recording buffer 131. In this case, the recording is performed by the temporary recording buffer 131 until the seven detection values recorded in the first ring buffer 121 when a recording condition is satisfied are all recorded in the specific recording area of the temporary recording buffer 131.

Hereinafter, it will be assumed that a detection value of the forward acceleration sensor 211 is no less than a predetermined value, and thus a recording condition is satisfied.

In step S201, a wait state is provided to perform sampling for a specific time (a predetermined period).

In step S202, a detection value newly detected by the forward acceleration sensor 211 is periodically input to the controller 110. Thereafter, the flow proceeds to step S203.

In step S203, it is determined whether the recording condition is satisfied in a current period. When the recording condition is satisfied in the current period, step S204 is performed. On the other hand, when the recording condition is not satisfied in the current period, step S206 is performed.

In step S204, it is determined whether a trigger signal is externally received. When the trigger signal is received, even if a new recording condition is satisfied, an operation which has to be carried out when the recording condition is satisfied is not performed. Instead, the flow proceeds to step S206. On the other hand, if the trigger signal is not externally received, the flow proceeds to step S205. For example, the trigger signal may be a signal obtained by delaying an airbag folding signal of an airbag device by a predetermined time. In the present embodiment, the trigger signal may be a signal which is delayed by a time for recording seven detection values.

In step S205, a counter value K that counts the number of detection values recorded in the recorder 130 is set to 1, while a second pointer and a third pointer are initialized (set to a first address of each recording area). Thereafter, the flow proceeds to step S206.

In step S206, it is determined whether the counter value K used for recording is 0 (zero). In this case, the counter value K is initialized to 0. If the counter value K is not 0, it means that a recording operation is being carried out for the recorder 130, and the flow proceeds to step S207. On the other hand, if the counter value K is not 0, it means that the recording operation is not being carried for the recorder 130, and the flow proceeds to step S213.

In step S207, a detection value recorded in an address recording area of the first ring buffer 121 indicated by the first pointer is recorded in an address recording area of the temporary recording buffer 131 indicated by the second pointer. In this case, the first pointer indicates an address at which an oldest detection value of detection values recorded in the first ring buffer 121 is stored. Further, the second pointer indicates the address B1 as a first address, followed by the addresses B1+1, B1+2, ..., B1+6.

Figure 8:
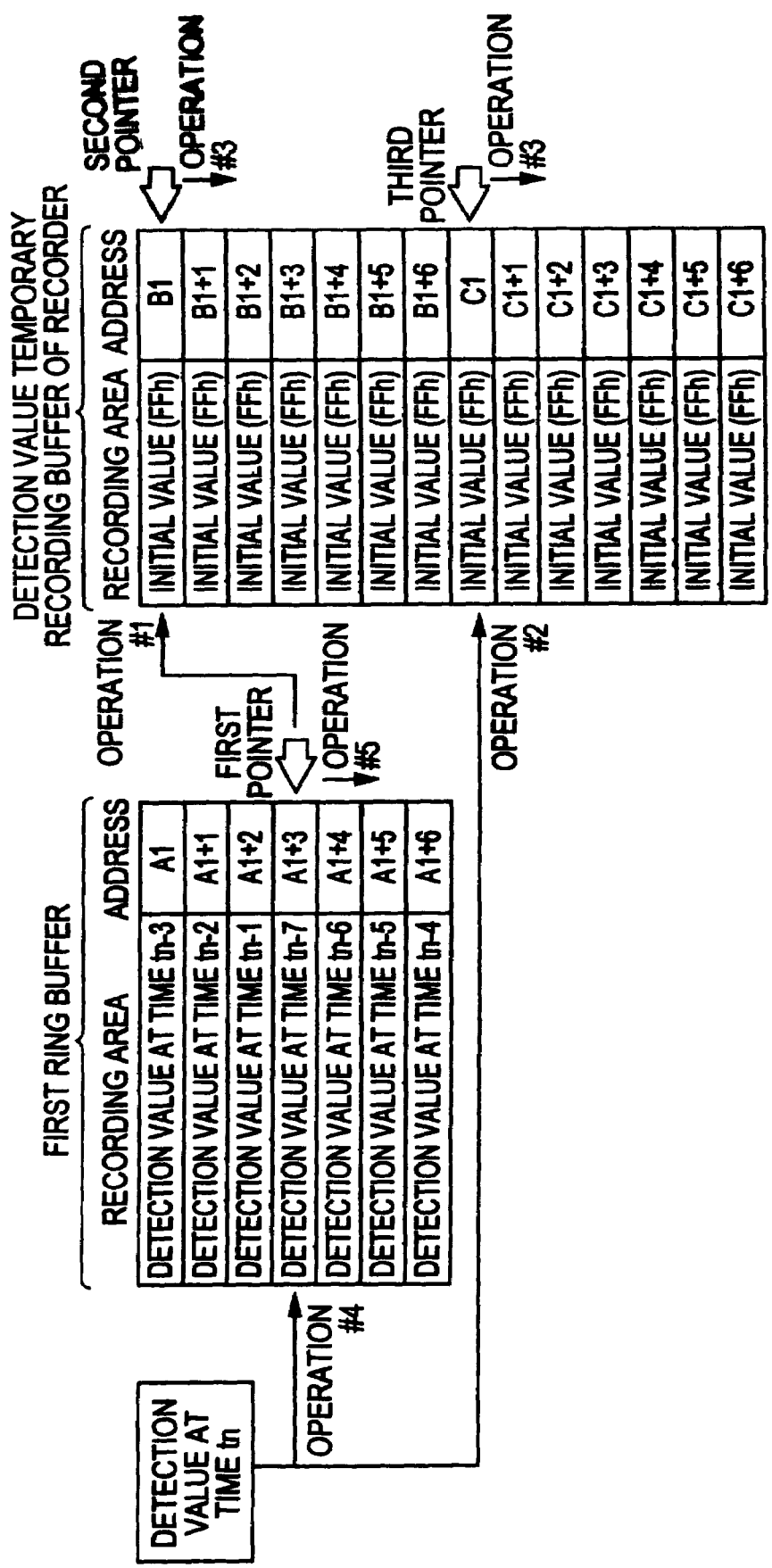
FIG. 8 shows another operation of a vehicle data recording device according to an embodiment of the present invention.
Figure 9:
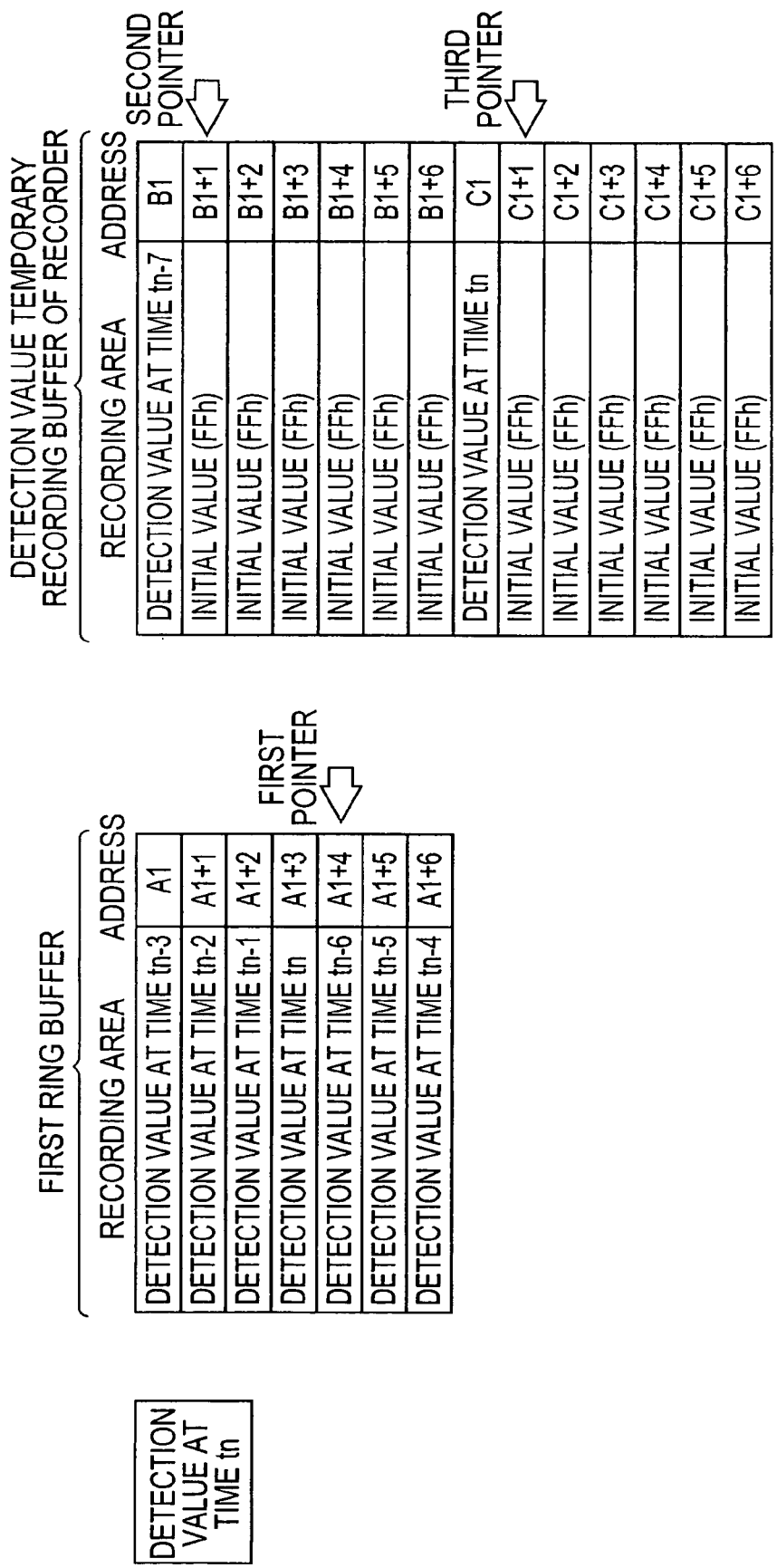
FIG. 9 shows another operation of a vehicle data recording device according to an embodiment of the present invention.

For example, referring to operation #1 of FIG. 8, the current time is tn, detection values at time tn−7 to tn−1 are recorded in the first ring buffer, the first pointer indicates the address A1+3 of a recording area where the detection value at time tn−7, that is the oldest time, is recorded, and the second pointer indicates the address B1 of the temporary recording buffer 131. In this case, as shown in FIG. 9, the detection value at time tn−7 recorded in the recording area of the address A1+3 of the first ring buffer 121 is recorded in the recording area of the address B1 of the temporary recording buffer 131.

Figure 10:
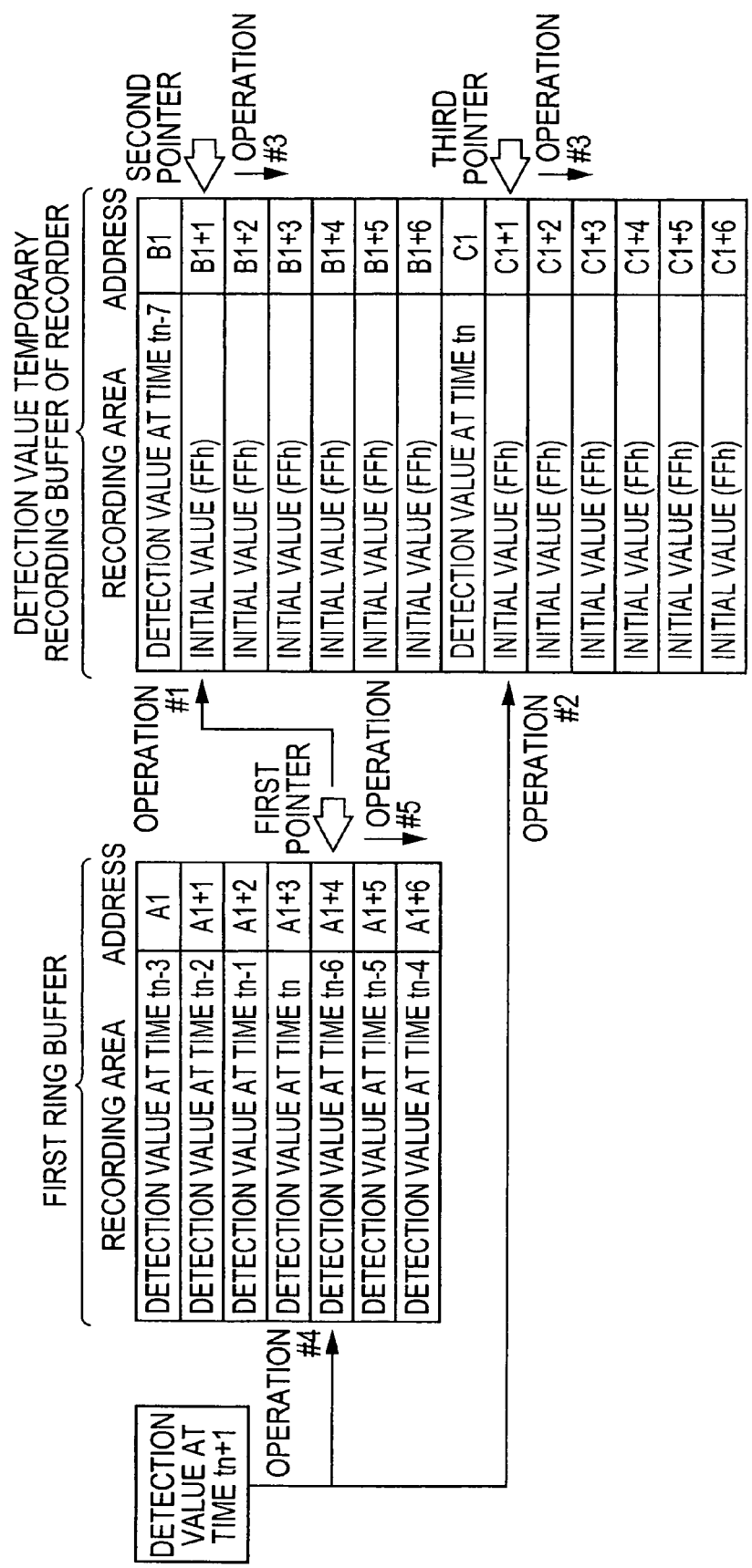
FIG. 10 shows another operation of a vehicle data recording device according to an embodiment of the present invention.
Figure 11:
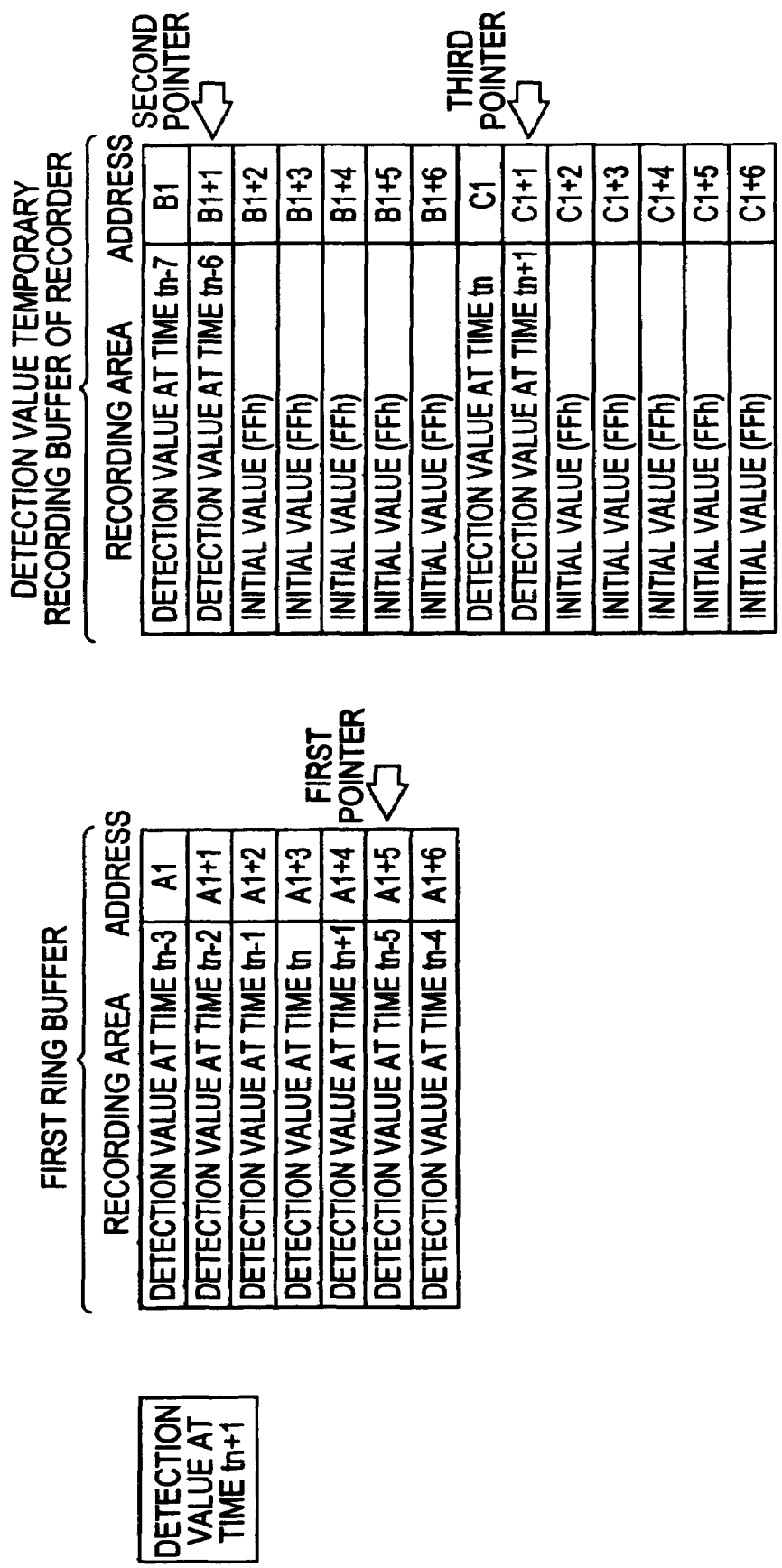
FIG. 11 shows another operation of a vehicle data recording device according to an embodiment of the present invention.

Further, referring to operation #1 of FIG. 10, the current time is tn+1, detection values at time tn−6 to tn are recorded in the first ring buffer 121, the first pointer indicates the address A1+4 of a recording area where the detection value at time tn−6, that is the oldest time, is recorded, and the second pointer indicates the address B1+1 of the temporary recording buffer 131. In this case, as shown in FIG. 11, the detection value at time tn−6 recorded in the recording area of the address A1+4 of the first ring buffer 121 is recorded in the recording area of the address B1+1 of the temporary recording buffer 131.

Figure 12:
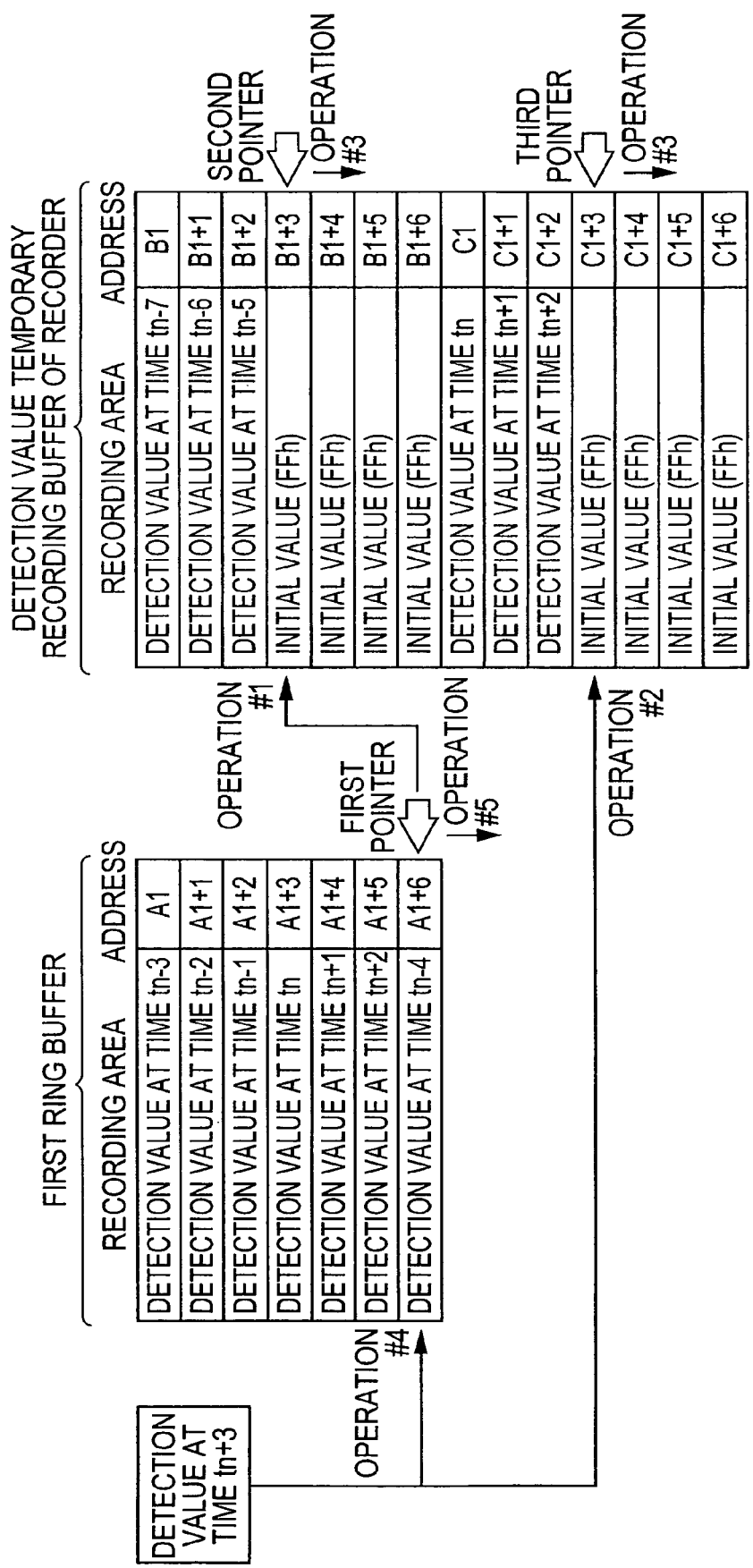
FIG. 12 shows another operation of a vehicle data recording device according to an embodiment of the present invention.
Figure 13:
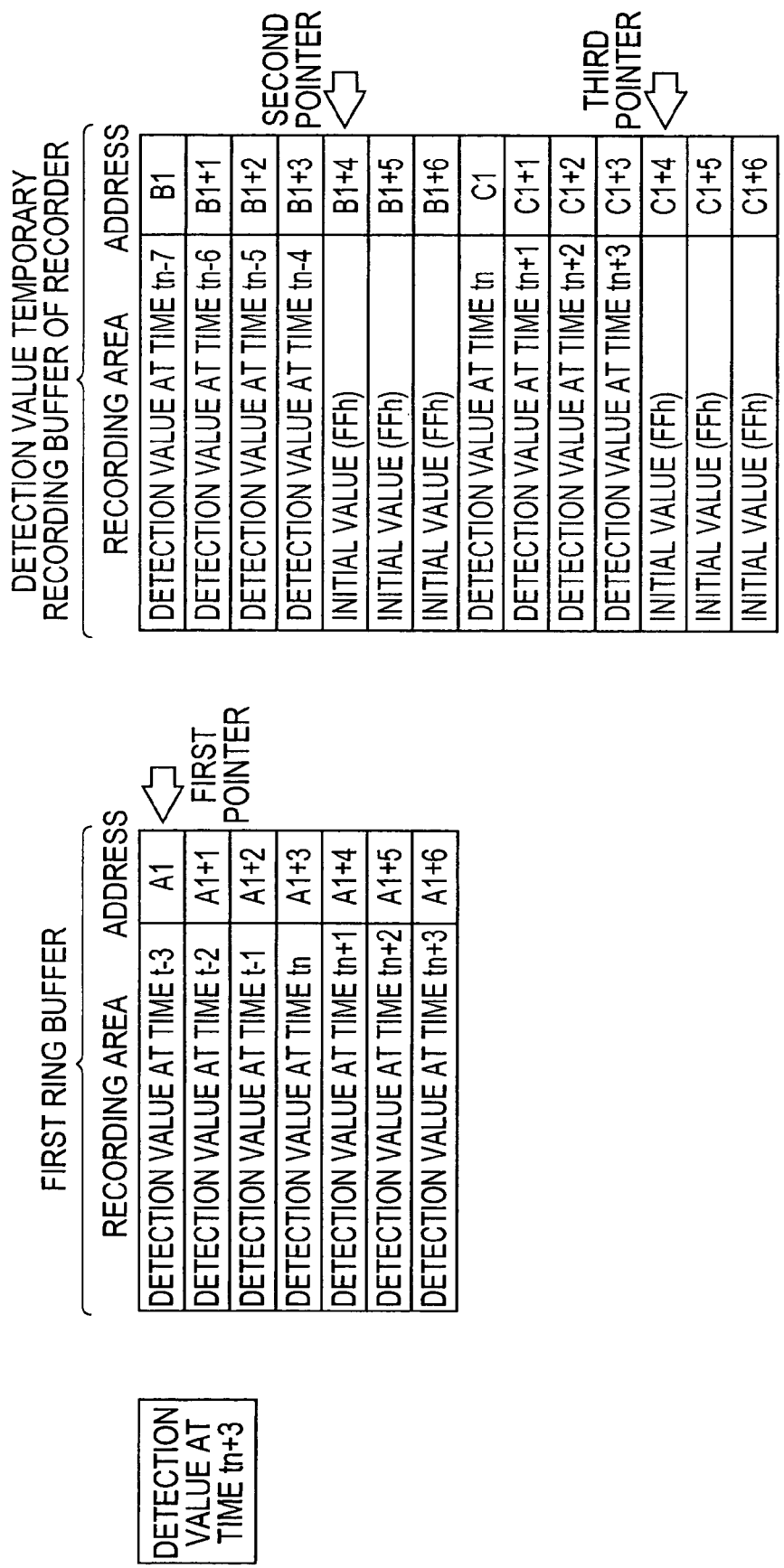
FIG. 13 shows another operation of a vehicle data recording device according to an embodiment of the present invention.

Further, referring to operation #1 of FIG. 12, the current time is tn+3, detection values at time tn−4 to tn+2 are recorded in the first ring buffer 121, the first pointer indicates the address A1+6 of a recording area where the detection value at time tn−4, that is the oldest time, is recorded, and the second pointer indicates the address B1+3 of the temporary recording buffer 131. In this case, as shown in FIG. 13, the detection value at time tn−4 recorded in the recording area of the address A1+6 of the first ring buffer 121 is recorded in the recording area of the address B1+3 of the temporary recording buffer 131.

Thereafter, the flow proceeds to step S208.

In step S208, a new detection value is recorded in the address recording area of the temporary recording buffer 131 indicated by the third pointer. In this operation, the third pointer indicates an address value C1 as a first address, followed by addresses C1+1, C1+2, ..., C1+6.

For example, referring to operation #2 of FIG. 8, the third pointer indicates the address C1 of the temporary recording buffer 131 at time tn. In this case, as shown in FIG. 9, a new detection value at time tn is recorded in a recording area of the address C1 of the temporary recording buffer 131.

Further, referring to operation #2 of FIG. 10, the third pointer indicates the address C1+1 of the temporary recording buffer 131 at time tn+1. In this case, as shown in FIG. 11, a new detection value at time tn+1 is recorded in the recording area of the address C1+1 of the temporary recording buffer 131. Further, referring to operation #2 of FIG. 12, the third pointer indicates the address C1+3 of the temporary recording buffer 131 at time tn+3. In this case, as shown in FIG. 13, a new detection value at time tn+3 is recorded in the recording area of the address C1+3 of the temporary recording buffer 131.

Thereafter, the flow proceeds to step S209.

In step S209, the second pointer value and the third pointer value are incremented by +1 for next recording.

For example, as shown in operation #3 of FIG. 8, and FIG. 9, the second pointer value is updated from B1 to B1+1 after recording is done for the temporary recording buffer 131. The third pointer value is updated from C1 to C1+1.

Further, as shown in operation #3 of FIG. 10, and FIG. 11, the second pointer value is updated from B1+1 to B1+2 after recording is done for the temporary recording buffer 131. The third pointer value is updated from C1+1 to C1+2.

Further, as shown in operation #3 of FIG. 12, and FIG. 13, the second pointer value is updated from B1+3 to B1+4 after recording is done for the temporary recording buffer 131. The third pointer value is updated from C1+3 to C1+4.

Thereafter, the flow proceeds to step S210.

In step S210, it is determined whether all detection values recorded in the first ring buffer 121 when a recording condition is satisfied are entirely recording in the temporary recording buffer 131. In the present embodiment, since the number of detection values recorded in the first ring buffer 121 is 7, if K=7, all of the detection values which have already been recorded in the first ring buffer 121 when a recording condition is satisfied are entirely recorded in the temporary recording buffer 131, and thus the flow proceeds to step S211. On the other hand, if K is not 7, the flow proceeds to step S212.

In step S211, K is set to 0, which means recording is done. Then, the flow proceeds to step S213, thereby returning back to the normal operation in which recording is performed only for the first ring buffer 121.

In step S212, K is incremented by +1. Thereafter, the flow proceeds to step S213, and recording operation is repeatedly performed for the temporary recording buffer 131 until K becomes equal to 7.

In step S213, a new detection value is recorded in the address recording area of the first ring buffer 121 indicated by the first pointer.

For example, referring to operation #4 of FIG. 8, the first pointer indicates the address A1+3 at time tn. In this case, as shown in FIG. 9, a new detection value at time tn is recorded in the recording area of the address A1+3.

Further, referring to operation #4 of FIG. 10, the first pointer indicates the address A1+4 at time tn+1. In this case, as shown in FIG. 11, a new detection value at time tn+1 is recorded in the recording area of the address A1+4.

Further, referring to operation #4 of FIG. 12, the first pointer indicates the address A1+6 at time tn+3. In this case, as shown in FIG. 13, a new detection value at time tn+3 is recorded in the recording area of the address A1+6.

Thereafter, the flow proceeds to step S214.

In step S214, the first pointer value is incremented by +1 for next recording.

For example, referring to operation #5 of FIG. 8, the detection value at time tn is recorded in the recording area of the address A1+3 of the first ring buffer 121. Thereafter, in this case, as shown in FIG. 9, the first pointer value becomes A1+4.

Further, referring to operation #5 of FIG. 10, the detection value at time tn+1 is recorded in the recording area of the address A1+4 of the first ring buffer 121. Thereafter in this case, as shown in FIG. 11, the first pointer value becomes A1+5.

Further, referring to operation #5 of FIG. 12, the detection value at time tn+3 is recorded in the recording area of the address A1+6 of the first ring buffer 121. Thereafter, in this case, since the number of address values of the first pointer is set to 7, that is, A1 to A1+6, the first pointer value returns back to A1, instead of A1+7.

Thereafter, the flow returns back to step S201, and step S201 to step S214 are repeated.

Figure 14:
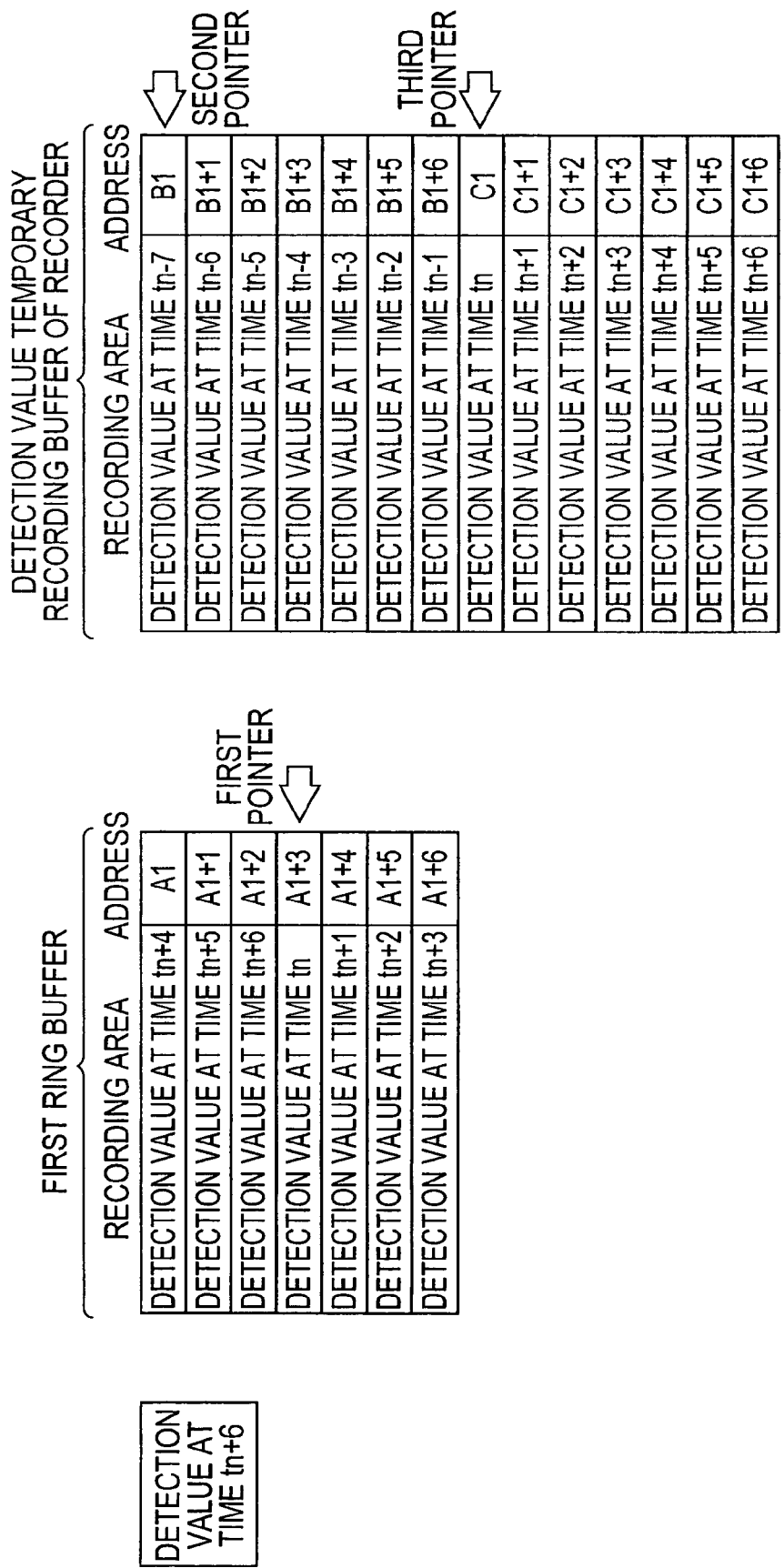
FIG. 14 shows another operation of a vehicle data recording device according to an embodiment of the present invention.

Recording states of the first ring buffer 121 and the temporary recording buffer 131 when K=7 is shown in FIG. 14. As shown in FIG. 14, seven detection values at time tn−7 to tn−1, which have already been recorded in the first ring buffer 121 at time tn when a recording condition is satisfied, are recorded in the recording areas of the addresses B1 to B1+6 of the temporary recording buffer 131 at a time when K=7. Further, the seven detection values at times tn to tn+6 are recorded in the recording areas of the addresses C1 to C1+6 of the temporary recording buffer 131.

In this case, if the address C1 is equal to the address B1+7, fourteen detection values at time tn−7 to time tn+6 are recorded in the recording areas of consecutive addresses of the temporary recording buffer 131 in the order of time series.

Further, since an address increment between the address indicated by the second pointer and the address indicated by the third pointer is constant, if the third pointer is defined as the sum of the second pointer and a specific address increment, the above operation can be carried out without having to use the third pointer. If the address increment is set to 7, that is, the number of the detection values of the vehicle status detecting sensor 200 of which the first ring buffer 121 to the eighth ring buffer 128 respectively record the detection values, then fourteen detection values at time tn−7 to time tn+6 are recorded in the recording areas of the consecutive addresses of the temporary recording buffer 131 in the order of time series.

After recoding is done for the temporary recording buffer 131, the detection value of the forward acceleration sensor 211 recorded in the temporary recording buffer 131 is copied to the detection value storage 132 that is a non-volatile memory, so as to be stored even if power stops being supplied from the recording device body 100.

Although a recording operation performed for the detection value of the forward acceleration sensor 211 has been described above, the same recording operation also applies to the central acceleration sensor 212, the right acceleration sensor 213, the left acceleration sensor 214, the vehicle speed sensor 221, the engine revolution sensor 222, the brake on-off sensor 223, and the accelerator opening angle sensor 224.

In the above description, the recording areas of the first ring buffer 121 to the eighth ring buffer 128 are equivalent to the first recording area and the fourth recording area, respectively. Further, the recording area of the temporary recording buffer 131 is equivalent to the second recording area, the third recording area, and the fifth recording area.

As described above, the vehicle data recording device 10 continuously and periodically records the detection value of the acceleration sensor 210 and the driving status detecting sensor 220 in the ring buffer 120.

In addition, when a recording condition is satisfied, a detection value which has already been recorded in the ring buffer 120 is recorded in a specific recording area of the recorder 130 before a new detection value is recorded in the ring buffer 120.

In addition, when a recording condition is satisfied, the new detection value is periodically recorded in another recording area of the recorder 130.

In this case, recording is performed for the recorder 130 until all detection values which have already been recorded in the ring buffer 120 when a recording condition is satisfied are entirely recorded in the specific recording area of the recorder 130.

In addition, when a trigger signal is externally received, the recorder 130 stops recording the detection value obtained thereafter.

According to the aforementioned operations, during a time when a recording condition is satisfied, in the present embodiment, detection values of a vehicle status detecting sensor at time tn−7 to tn+6 are recorded in a non-volatile memory at time tn when a recording condition is satisfied.

Since a ring buffer continuously records a new detection value even after a recording condition is satisfied, if the recording condition is satisfied several times, a detection value obtained when a recording condition is lastly satisfied can be overwritten in a recorder. When a trigger signal is externally received, the recorder stops recording a detection value obtained thereafter. Thus, an important detection value can be avoided from being overwritten with a new detection value recorded in the recorder by using the trigger signal. For example, if an airbag of an airbag device is unfolded due to an external impact while a recording condition is satisfied so that a detection value of a vehicle status detecting sensor is recorded in the recorder, and thereafter the recording condition is satisfied again due to another external impact, then a trigger signal is generated in response to a airbag unfolding signal. Accordingly, the recorder stops performing overwriting when the recording condition is secondly satisfied. Therefore, a detection value of the vehicle status detecting sensor can be stored when the airbag is unfolded.

Since the detection value is periodically recorded in a recording area indicated by a pointer instead of performing rearrangement of the detection value recorded in a ring buffer, a load of a recording controller can be reduced. As a result, the recording controller does not require an expansive CPU capable of a high speed operation, and thus increase in cost of the device can be avoided.

While exemplary embodiments of the present invention has been described with reference to the accompanying drawings, the exemplary embodiments should be considered in descriptive sense only and not for purposes of limitation. Therefore, various changes in form and details made therein without departing from the spirit and scope of the present invention will be construed as being included in the present invention.

For example, although it has been defined in the present embodiment that "the case that a detection value of a vehicle status detecting sensor satisfies a specific condition (when a recording condition is satisfied)" is defined as "the case that a detection value of a forward acceleration sensor becomes no less than a predetermined value", other conditions may be defined therefor, for example, "the case that a detection value of a central acceleration sensor is no more than a predetermined value".

In addition, although a recorder performs overwriting by limiting a recording capacity of the recorder when a recording condition is satisfied for several times in the present embodiment, all detection values obtained when the recording condition is satisfied for several times may be recorded by increasing the recording capacity of the recorder.

In addition, the number N of detection values recorded in a ring buffer and a recorder is not limited to seven as described in the present invention.

In addition, attachment locations of sensors of the number of sensors are not limited to the description of the present embodiment.

In addition, a driving status detecting sensor is not limited to the sensor described in the present embodiment, and any sensor may be used if it detects a driving status of a vehicle.

In addition, a detection value of the driving status detecting sensor may be structured such that it is input via a controller area network (CAN) which is a standard of a distribution control network.

In addition, a block diagram is not limited as described in the present embodiment, and any block diagram may be used if it provides the same function.

What is claimed is:

1. A vehicle data recording device, comprising:
   a vehicle status detecting sensor that detects a vehicle status while running;
   a ring buffer including a first recording area that records a detection value of the vehicle status detecting sensor;
   a recorder including a second recording area and a third recording area that record a detection value of the vehicle status detecting sensor; and
   a recording controller configured to normally perform a normal operation in which the detection value of the vehicle status detecting sensor is periodically recorded in the first recording area of the ring buffer,
   wherein the ring buffer is configured to record a detection value of the normal operation in the second recording area and a larger detection value than a predetermined value of the detection value in the third recording area when the vehicle status detecting sensor generates the larger detection value,
   wherein the recording controller is configured to record the detection value of the vehicle status detecting sensor, which has already been recorded in the first recording area of the ring buffer, in the second recording area before the detection value of the vehicle status detecting sensor is periodically recorded in the first recording area of the ring buffer when the detection value of the vehicle status detecting sensor detects the larger detection value, and thereafter perform a recording operation, in which a new detection value of the vehicle status detecting sensor is recorded in the first recording area of the ring buffer while the new detection value of the vehicle status detecting sensor is recorded in the third recording area of the recorder, until the detection value of the vehicle status detecting sensor, which has already been recorded in the first recording area of the ring buffer when the vehicle status detecting sensor detects the larger detection value, is entirely recorded in the second recording area of the recorder, and thereafter perform the normal operation.

2. A vehicle data recording device, comprising:
   a vehicle status detecting sensor that detects a vehicle status while running;
   a ring buffer including a fourth recording area that records N detection values of the vehicle status detecting sensor;
   a recorder including a fifth recording area that records at least 2N detection values of the vehicle status detecting sensor; and a recording controller that includes a first pointer which indicates an address of the fourth recording area of the ring buffer so that addresses are sequentially incremented from a first address until the number of detection values becomes equal to N, and the addresses are sequentially incremented returning back to the first address for every Nth detection values when the number of detection values exceeds N, a second pointer which indicates an address of the fifth recording area of the recorder so that the addresses are sequentially incremented from a second address, and a third pointer which indicates an address of the fifth recording area of the recorder so that the addresses are sequentially incremented from a third address, and that normally performs a normal operation, in which the detection value of the vehicle status detecting sensor is periodically recorded in the fourth recording area of an address indicated by the first pointer and then the first pointer is incremented, and records the detection value of the vehicle status detecting sensor, which has already been recorded in the fourth recording area of the address indicated by the first pointer, in the fifth recording area of the address indicated by the second pointer before the detection value of the vehicle status detecting sensor is periodically recorded in the fourth recording area of the ring buffer when the vehicle status detecting sensor detects a larger detection value than a predetermined value of the detection value, and thereafter periodically performs a recording operation for N times, in which a new detection value of the vehicle status detecting sensor is recorded in the fourth recording area of the address indicated by the first pointer and then the first pointer and the second pointer are incremented while the new detection value of the vehicle status detecting sensor is recorded in the fifth recording area of the address indicated by the third pointer and then the third pointer is incremented, and thereafter performs the normal operation.

3. A vehicle data recording device, comprising:

a vehicle status detecting sensor that detects a vehicle status while running;

a ring buffer including a fourth recording area that records N detection values of the vehicle status detecting sensor;

a recorder including a fifth recording area that records at least 2N detection values of the vehicle status detecting sensor; and a recording controller that includes a first pointer which indicates an address of the fourth recording area of the ring buffer so that the addresses are sequentially incremented from a first address until the number of detection values reaches N, and the addresses are sequentially incremented returning back to the first address for every Nth detection values when the number of detection values exceeds N, and a second pointer which indicates an address of the fifth recording area of the recorder so that the addresses are sequentially incremented from a second address, and that normally performs a normal operation, in which the detection value of the vehicle status detecting sensor is periodically recorded in the fourth recording area of an address indicated by the first pointer and then the first pointer is incremented, and records the detection value of the vehicle status detecting sensor, which has already been recorded in the fourth recording area of the address indicated by the first pointer, in the fifth recording area of the address indicated by the second pointer before the detection value of the vehicle status detecting sensor is periodically recorded in the fourth recording area of the ring buffer when the vehicle status detecting sensor detects a larger detection value than a predetermined value of the detection value, and thereafter periodically performs a recording operation for N times, in which a new detection value of the vehicle status detecting sensor is recorded in the fourth recording area of the address indicated by the first pointer and then the first pointer is incremented while the new detection value of the vehicle status detecting sensor is recorded in the fifth recording area of the address which is separated from the address indicated by the second pointer by a predetermined address increment and then the second pointer is incremented, and thereafter performs the normal operation.

4. The vehicle data recording device of claim 1, wherein in the recording controller, the recorder stops a recording operation after a trigger signal is received when the trigger signal is externally received.

5. The vehicle data recording device of claim 1, wherein the vehicle status detecting sensor includes an acceleration sensor that detects impact force externally applied to the vehicle, or includes a driving status detecting sensor that detects a driving status of the vehicle along with the acceleration sensor.

6. The vehicle data recording device of claim 5, wherein the acceleration sensor includes a forward acceleration sensor that is disposed near the forward direction of the vehicle so as to detect impact force from the forward direction of the vehicle, a central acceleration sensor that is disposed near a center portion of the vehicle so as to detect impact force applied to the vehicle from the forward direction, and the right and left directions of the vehicle, a right acceleration sensor that is disposed near a right side of the vehicle so as to detect impact force applied to the vehicle from the right side thereof, and a left acceleration sensor that is disposed near the left side of the vehicle so as to detect impact force applied to the vehicle from the left direction thereof.

7. The vehicle data recording device of claim 5, wherein the driving status detecting sensor includes at least one of a vehicle speed sensor that detects a vehicle speed, an engine revolution sensor that detects the number of resolutions of an engine, a brake on-off sensor that detects whether a brake of the vehicle is on or off, and an accelerator opening angle sensor that detects opening angle of an accelerator.

8. The vehicle data recording device of claim 2, wherein the third address is defined as the second address+N.

9. The vehicle data recording device of claim 3, wherein the predetermined address increment is N.

10. The vehicle data recording device of claim 1, wherein when the vehicle status detecting sensor detects a plurality of detection values which are larger detection values than a predetermined value, the final larger detection value is recorded in the third recording area of the recorder.

* * * * *